United States Patent [19]
Miller et al.

[11] Patent Number: 5,475,746
[45] Date of Patent: Dec. 12, 1995

[54] METHOD FOR PERMITTING SUBSCRIBERS TO CHANGE CALL FEATURES IN REAL TIME

[75] Inventors: Eileen O. Miller, Short Hills, N.J.; James B. Shepard, Pickerington, Ohio

[73] Assignee: AT&T Corp., Murray Hill, N.J.

[21] Appl. No.: 291,316

[22] Filed: Aug. 17, 1994

Related U.S. Application Data

[63] Continuation of Ser. No. 125,470, Sep. 22, 1993, abandoned.

[51] Int. Cl.⁶ ........................................... H04M 3/42
[52] U.S. Cl. .......................... 379/201; 379/279; 379/95; 379/207
[58] Field of Search .................... 379/201, 204, 379/205, 207, 210, 211, 279, 95

[56] References Cited

U.S. PATENT DOCUMENTS

| | | | |
|---|---|---|---|
| 4,150,428 | 4/1979 | Inrig et al. | 379/279 |
| 4,313,035 | 1/1982 | Jordan et al. | 179/18 |
| 4,611,094 | 9/1986 | Asmuth et al. | 179/7.1 TP |
| 4,823,374 | 4/1989 | Verlohr | 379/201 |
| 5,012,511 | 4/1991 | Hanle et al. | 379/201 |
| 5,027,384 | 6/1991 | Morganstein | 379/67 |
| 5,136,636 | 8/1992 | Wegrzynowicz | 379/201 |
| 5,181,238 | 1/1993 | Medamana et al. | 379/207 |
| 5,222,125 | 6/1993 | Creswell et al. | 379/201 |
| 5,243,645 | 9/1993 | Bissell et al. | 379/211 |

FOREIGN PATENT DOCUMENTS

| | | |
|---|---|---|
| 0510411 | 3/1992 | European Pat. Off. . |
| WO92/09164 | 5/1992 | WIPO ............ H04M 3/00 |

Primary Examiner—Jeffery A. Hofsass
Assistant Examiner—Scott Wolinsky
Attorney, Agent, or Firm—Charles L. Warren

[57] ABSTRACT

A telephone subscriber to a long distance telecommunication system is permitted, in accordance with this invention, to enter changes in real time utilizing a conventional Touch-tone telephone to control the routing or handling of incoming calls. A real-time update network control point (RTU NCP) is accessed by subscribers and contains input steps which controls the entry of changes by the subscriber. Upon the completion of the entry by the subscriber of the desired changes in RTU NCP, the latter causes the changes to be transmitted to the subscriber's NCP (SUB NCP) which controls the processing of incoming calls to a directory number associated with the subscriber based on subscriber data stored in the SUB NCP. The SUB NCP data corresponding to the subscriber is modified in accordance with the changes, so that incoming calls will be handled in accordance with the changed subscriber data.

27 Claims, 1 Drawing Sheet

METHOD FOR PERMITTING SUBSCRIBERS TO CHANGE CALL FEATURES IN REAL TIME

This application is a continuation of application Ser. No. 08/125,470, filed on Sep. 22, 1993, now abandoned.

BACKGROUND OF THE INVENTION

This invention generally relates to telecommunication systems which support subscriber definable telephone features and is more specifically directed to a method utilized in a telecommunication system which permits changes to be entered in real time by a subscriber which controls call routing or features utilized with incoming calls.

Telecommunication networks exist in the United States which provide efficient call handling of local and long distance calls. Telecommunications switches such as the AT&T 5ESS® switch can accommodate a plurality of local subscribers. The subscriber has limited control of certain optional features such as the ability to selectively activate and deactivate the "call waiting" feature once initially placed in service for the subscriber by the subscriber's local exchange carrier (LEC). For example, it may be desirable for a subscriber who utilizes the same telephone line for voice and modem communications to disable the call waiting feature prior to initiating communications utilizing a modem in order to minimize possible interference which could occur if the call waiting feature attempted to alert the subscriber to an incoming call during modem communications.

The public switched telephone network makes use of common channel interoffice signaling (CCIS) to permit messages to be passed within the network. A long distance or toll telecommunication network may include a plurality of gateway switches, such as an AT&T 4ESS™ switch, which connect local exchange carriers and provide long distance service to LEC subscribers. The long distance network may also include signal transfer points (STP) which are coupled to the gateway switches and to network control points (NCP). The STPs facilitate the transmission of interoffice messages and signaling. The NCPs provide distributed intelligence in the form of a database which stores data and records that facilitate the interaction of the network elements and store feature and function definitions associated with directory numbers. For example, toll free calls utilizing the well-known 800-XXX-XXXX number sequence in the United States may utilize data stored for a dialed 800 number to determine the actual directory number destination of the incoming call. A subscriber can request a change of the destination directory number associated with the subscriber's 800 service by calling a long distance service representative and telling the representative of the desired change. The requested change is entered in a log by the service representative. Typically, a long distance employee knowledgeable of network commands enters the change indicated in the log.

U.S. Pat. No. 4,313,035 addresses a method utilizing the public switched telephone network to provide a nationwide personal locator telephone service for called subscribers. A unique personal locator number is assigned to each subscriber and is used by the subscriber to initiate changes in the way calls are handled and by calling parties who utilize the personal locator service feature to reach the subscriber. A single database stores corresponding personal locator data for all subscribers.

In U.S. Pat. No. 4,611,094 a method is described for allowing a customer to define its telephone service provided within certain boundaries. Switching offices called action points provide call processing of incoming calls based on called party parameters stored in a network control point.

SUMMARY OF THE INVENTION

It is an object of the present invention to provide an improved method which permits subscribers to make modifications in real time of the way incoming calls will be routed or processed by the long distance network. This is an advantage over conventional long distance networks which require user initiated changes to be communicated to a service representative for entry at a later time.

In accordance with an illustrative embodiment of the present invention, a real-time update (RTU) NCP provides a single point of contact for all subscribers seeking to initiate call handling changes such as the way incoming calls to the subscriber's 800 number are handled. The subscriber initiates changes by dialing a predetermined 800 number associated with the RTU NCP. The RTU NCP preferably interacts with the subscriber by utilizing a speech system, such as associated with a gateway switch, to prompt the subscriber to enter subscriber identification data and an account number, directory number to be affected, and a personal identification number (PIN) as well as data indicative of the call parameter to be changed. Preferably, data entered by the subscriber is validated as consisting of the proper format and permitted range of choices. Upon the completion of the interaction between the subscriber and the RTU NCP, the latter transmits the change data to an NCP which maintains the call control record of the directory number associated with the change, i.e. the subscriber NCP (SUB NCP). Upon the entry of the modified data into the subscriber's control record at the SUB NCP, all subsequent calls made to the subscriber's directory number to which the changes apply will receive treatment in accordance with the changes entered by the subscriber. Thus, the subscriber is able to make real time changes to control the treatment of calls received by the subscriber.

DETAILED DESCRIPTION

Figure 1:
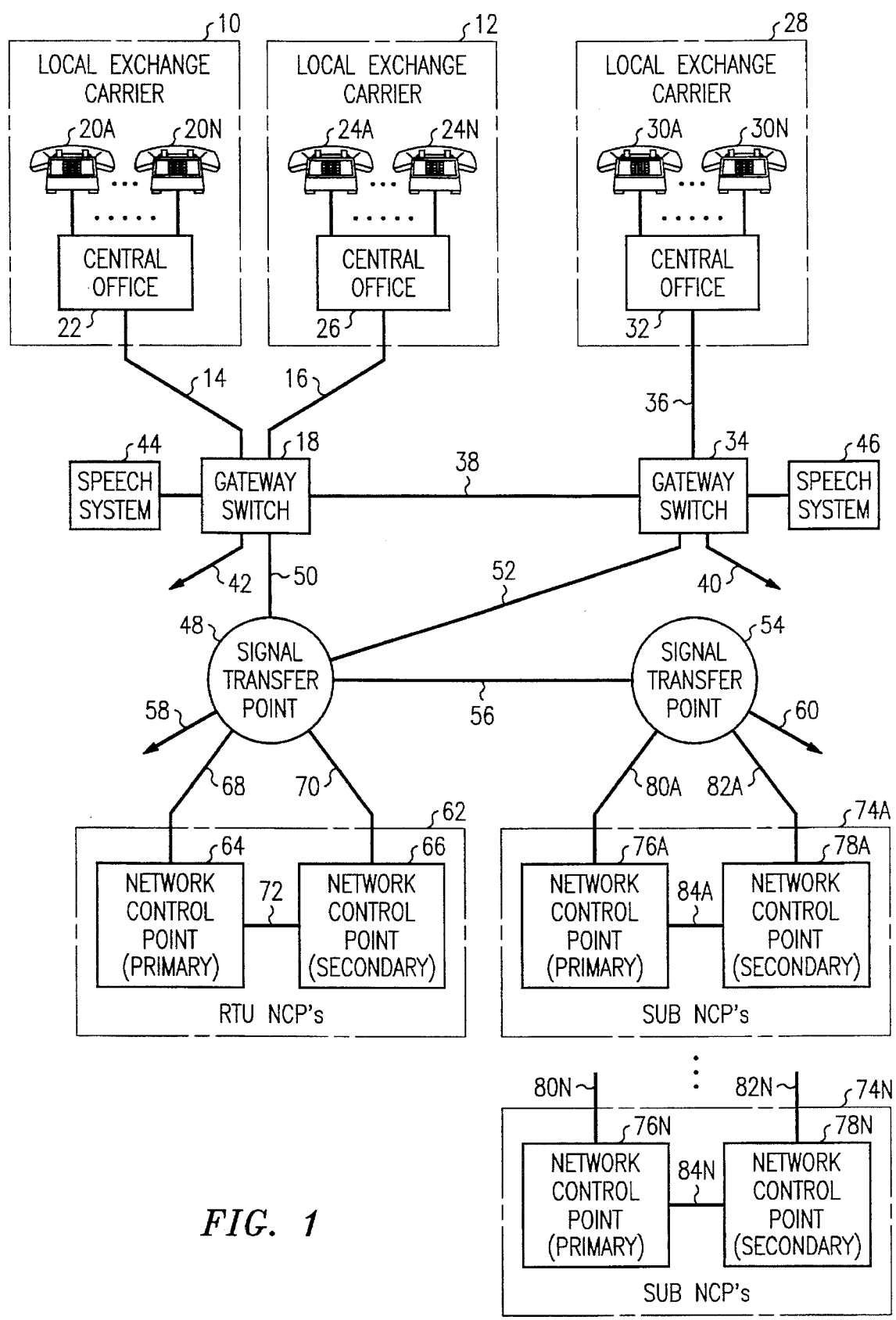
FIG. 1 is a block diagram illustrating a telecommunication network which supports the steps in accord with an illustrative method of the present invention.

FIG. 1 illustrates a telecommunication network including local exchange carders 10 and 12 which are connected by communication channels 14 and 16, respectively, with a gateway switch 18 that is part of the long distance or toll portion of the network. The local exchange carrier 10 supports a plurality of telephone subscribers associated with telephones 20A–20N. A central office 22 supports these subscribers and may consist of a telecommunication switch such as an AT&T 5ESS switch. Similarly, local exchange carrier 12 supports its subscribers by telephones 24A–24N and central office 26.

Another local exchange carder 28 supports subscribers associated with telephones 30A–30N, and includes a central office 32. The LEC 28 is connected to a gateway switch 34 by communication channels 36. The gateway switches 18 and 34, such as AT&T 4ESS switches, are coupled by communication channels 38. These switches are also coupled by communication channels 40 and 42 to other portions of the telecommunication network. Speech systems 44 and 46 are coupled to gateway switches 18 and 34, respectively. The speech systems include speech recognition and speech synthesis capabilities thereby permitting predetermined voice messages to be sent to a subscriber and provide speech recognition of messages voiced by the subscriber.

In the illustrative embodiment, gateway switches 18 and 34 are connected to a signal transfer point (STP) 48 by communication channels 50 and 52, respectively. The STP may comprise an AT&T number 2 signal transfer point (2STP) which functions as a stored program control system. The STP functions as a relay node in the common channel interoffice signaling (CCIS) network which carries control information and signaling between network elements. The STP 48 is coupled to another STP 54 by communication channels 56. The STP 48 and 54 are also coupled to other portions of the telecommunication network by communication channels 58 and 60, respectively.

A network control point (NCP) set 62 includes two substantially identical NCP's 64 and 66. An NCP is a database facility such as an AT&T number 2 direct services dialed network control point (2DSD NCP). The NCPs are typically disposed in the network in pairs consisting of a primary and secondary unit which store identical data records with the secondary NCP functioning as a redundant unit to minimize the possibility of the loss or unavailability of data in the event of a failure associated with the primary NCP. The NCPs 64 and 66 are connected to STP 48 by communication channels 68 and 70, respectively. A communication channel 72 couples NCP 64 and 66 thereby permitting the direct transfer of data between same. In this illustrative embodiment, the NCP set 62 is referenced as the real time update (RTU) NCP as will be explained in more detail below.

A plurality of NCP sets 74A–74N each comprise respective NCPs 76A–76N and 78A–78N. Each of the NCP's 76 and 78 are coupled to a signal transfer point in the network by communication channels 80A–80N and 82A–82N. These NCP sets are referred to as subscriber (SUB) NCPs in the illustrative embodiment. Each subscriber which requires toll system database support is supported by a corresponding account record stored in one of the SUB NCP's. For example, a subscriber to the 800 toll free number service would have identical account records stored in a primary and secondary mate SUB NCP which would be utilized to control the actual destination address (directory number) for calls placed to the subscriber. Each of the primary and secondary pairs of SUB NCPs are connected to each other by respective communication channels 84A–84N.

The embodiment of the present invention is especially, but not exclusively, suited for permitting subscribers to a service, such as 800 toll free service, to make real-time changes of call handling features of incoming calls using conventional Touch-tone telephones. For example, a business subscriber for an 800 service may normally have incoming calls routed to a main call answering center. The subscriber may have auxiliary call answering centers which are utilized only during times of peak loading. Should an unexpected event, such as a fire or weather cause the primary call handling center to be unable to handle incoming calls, the embodiment of the present invention would permit an authorized user of the 800 business subscriber to make a real-time change causing incoming calls directed to the 800 number to be directed to an auxiliary call center which could be appropriately staffed to handle the normal volume expected by the main call center.

It will be apparent that additional call handling features can be changed by the subscriber in real time. For example, incoming calls can receive different processing based on date and/or time of the call, the caller's directory number, and combinations of such factors. The data, which specifies such criteria and is stored in the SUB NCP, can be changed by the subscriber in real time to cause a corresponding change in the handling of incoming calls.

Table I is a flow listing which provides an overview of the steps associated with a real-time change in accordance with the embodiment of the present invention. These steps illustrate a real-time change entered by a subscriber to 800 telephone service. The steps of Table I should be considered in view of FIG. 1 in order to maintain a visual perspective of the relationship of the network elements and the steps.

Table I (1) A subscriber 20A desires to enter a real-time change of the destination of inbound calls to its 800-aaa-bbbb number (SN) from a first to a second call processing center, i.e. from a first to a second directory number.

(2) The subscriber 20A dials a predetermined 800 number (PN) established by the long distance provider to accept such real-time changes.

(3) The subscriber's local CO 22 routes the PN call to the associated gateway switch 18.

(4) The gateway switch 18 responds by using global title translation (GIT) to locate the address of the destination NCP, i.e. NCP 64. Gateway switch 18 then sends a change initiation message via STP 48 to NCP 64 which is part of the RTU NCP set 62.

(5) NCP 64 contains an RTU entry program associated with the PN. The entry program is a structured prompting and input process that controls the sending of prompts to the subscriber, receiving of responses from the subscriber, and validation of the responses.

(6) In response to the change initiation message, the NCP 64 controls the sending of voice prompts by speech system 44 to the subscriber and receives responses by the subscriber such as the subscriber's account number, personal identification number (PIN), SN associated with the change, and other data relevant to the particular change such as a new directory number to be the destination of future inbound calls to the SN. The program validates the information entered by the subscriber and the resulting changes requested.

(7) Upon the validation and acceptance of requested change, NCP 64 stores an update file containing the requested change and related subscriber information, and causes a corresponding backup file to be stored in the RTU NCP mate.

(8) NCP 64 then sends a first update message via the STP 48 to the gateway switch 18. The first update message contains the update file.

(9) Upon receipt of the first update message, the gateway switch 18 uses GTT to locate the address of the SUB NCP associated with the SN to which the changes apply (SUB NCP 76A) and sends a second update message that also contains the update file via STPs 48 and 54 to SUB NCP 76A.

(10) The SUB NCP 76A uses the information in the second update message to update the control record corresponding to the SN to reflect the changes.

(11) Upon the entry of changes to the control record in SUB NCP 76A, the SUB NCP 76A causes the corresponding backup subscriber record in the SUB NCP mate 78A to be updated.

(12) Then, SUB NCP 76A causes an update complete message to be sent to the subscriber confirming the entry of the changes via STPs 54 and 48, gateway switch 18, speech system 44, and CO 22. This completes the real-time change process.

(13) Calls placed to the SN subsequent to the completion of the above step will be handled in accordance with the updated control record stored in NCP 76A.

The above example of an embodiment of the present invention should be contrasted with the conventional process used to enter changes to 800 call service. In a conventional network, a subscriber who desires to change the routing destination of calls placed to an 800 directory number would call a network representative and verbally describe the desired change. The network representative upon confirming the identity of the subscriber would log the requested change. Typically, another person knowledgeable of NCP protocols and connected to the long distance network by computer would receive the log containing the requested change and issue the appropriate commands to cause the subscriber's control record in the SUB NCP to be updated. In this example, two people employed by the network are utilized to effectuate the entry of the change. It will be apparent that the likelihood of making a mistake increases with the number of people and steps involved in a process. Also, the time to implement the desired change could take a substantial period of time. The present invention minimizes the likelihood for mistakes and provides real-time implementation of subscriber updates.

The following is a detailed call flow of an illustrative embodiment of a method in accord with the present invention. Assume that subscriber 20A desires to enter a real-time change of the destination of inbound calls to the subscriber's 800 number (SN). This subscriber dials the predetermined 800 number (PN) established to accept such real-time changes. The subscriber's central office 22 routes the PN call to the associated gateway switch 18 referred to as the originating access switch (OAS). The OAS then completes a ten-digit global title translation on the PN number to identify the CCIS element address to be utilized, which in the illustrative example, is NCP 64. The OAS then sends a BEGIN message via the CCIS system including STP 48 to NCP 64. The BEGIN message may be transmitted utilizing the signaling system number 7 transaction capabilities application part (SS7 TCAP) message.

Upon NCP 64 receiving the BEGIN message, it accesses an RTU entry program stored in NCP 64 which controls the real-time subscriber update process. NCP 64 transmits a message via STP 48 and gateway switch 18 to speech system 44 causing an announcement to be played to the subscriber requesting entry of the subscriber's account code. NCP 64 is able to address or route this message since the subscriber's originating telephone number and the address of gateway switch 18 was provided as part of the BEGIN message transmitted to NCP 64. Upon the entry of the user's account code, gateway switch 18 sends this information to NCP 64. NCP 64 then initiates another message transmitted by STP 48 and gateway switch 18 to speech system 44 to play an announcement requesting the subscriber to enter his PIN. The entry by the subscriber of the PIN is transmitted by gateway switch 18 to NCP 64. The NCP 64 then transmits another message to speech system 44 which plays an announcement requesting the subscriber to enter the 800 number to be updated. Upon entry of the 800 number to be updated, these digits are collected by central office 22, forwarded via gateway switch 18 to NCP 64. The NCP then issues a message to speech system 44 to play an announcement requesting the subscriber to enter the desired directory number to which calls to the 800 number will be routed. Upon the subscriber entering the new directory number, central office 22 forwards the information via gateway switch 18 to NCP 64. Thus, NCP 64 now has obtained complete information directly from the subscriber concerning an update request.

Preferably, NCP 64 contains or has access to a database for verifying the validity of the requested change by verifying the entered PIN number corresponds to the PIN stored in the database corresponding to the entered account number. The database is also checked to confirm that the 800 number to be modified corresponds to the 800 number associated with the account code in the database. Another database either stored in the NCP or accessible by it, is preferably referenced to validate the new destination number requested by the subscriber. For example, tariffs may not permit a destination directory number change from an intrastate to an interstate number. It will be apparent that other regulatory restrictions or validation characteristics may be contained in such a database in order to validate the requested change. If the requested change is not authorized, the NCP will terminate the process by causing speech system 44 to play an announcement to the subscriber indicating that the requested destination number is not approved and requesting that the subscriber select another destination number or call a network representative for assistance regarding the change.

After collection of the subscriber information and validation of the requested change, NCP 64 will then send an SS7 TCAP BEGIN message using the node address contained in the original BEGIN message from the OAS. The subscriber's 800 number will be in a dialed number field of the TCAP message and the new call destination number will be contained as a parameter in the message. Upon receiving the BEGIN message from NCP 64, the OAS will perform a ten-digit GTT translation of the subscriber's 800 number into the node address of the NCP containing the subscriber's customer account record (NCP 76A) and will send a BEGIN message to the identified NCP. Upon NCP 76A receiving the BEGIN message from the OAS, NCP 76A extracts the necessary information required for a record update from the BEGIN message and stores it in an update register. NCP 76A utilizes the subscriber's 800 number to access the subscriber's customer record stored in NCP 76A. The new destination number entered by the subscriber is entered in the customer's account record, preferably in a separate RTU field as opposed to merely overriding an existing stored destination number stored in a separate field of the customer's account record. At a later date, a maintenance program can be utilized if desired to override the destination number field with the RTU field of the same customer record after a time sufficient to validate that the newly entered destination number by the subscriber is satisfactory from a validation and user perspective. Incoming 800 calls will be routed to the directory number stored in the RTU field assuming a number exists in this field. Otherwise, incoming calls are routed to the normal destination number field stored in the customer's account record.

NCP 76A then sends an update message to the mate NCP 78A where similar steps are carded out, that is, the duplicate customer record is modified in the same way as that of NCP 76A. NCP 76A then sends a TCAP END message indicating success or failure back to NCP 64. Upon NCP 64 receiving the END message from NCP 76A, the RTU enter routine in NCP 64 will determine an appropriate announcement to be played to the subscriber by speech system 44 dependent on whether the requested change was successful or not. The subscriber call can now be disconnected since it has been concluded and, if successful, an update has now been entered and can be accessed by future calls to the subscriber's 800 number.

The illustrative embodiment of the present invention illustrates advantages provided by this invention. A single update number is accessed by subscribers to enter the real-time changes. An interactive communication with the subscriber permits the subscriber to enter the changes using a conventional Touchtone telephone period. The entered changes are effective in real time, thereby permitting subscribers with increased flexibility in being able to effectively enter changes to address changing conditions. Although the illustrative example has indicated changes to the destination number, it will be apparent to those skilled in the art that various changes of call handling and processing parameters which can be controlled by the customer account record can be changed in a similar manner by the subscriber.

Although an illustrative embodiment of the present invention has been shown, the scope of the invention is defined by the claims which follow.

We claim:

1. In a telecommunication system that provides selectable call handling features, a method for permitting real time changes to be made by subscribers to the selectable call handling features, the method comprising the steps of:

routing a call from a first subscriber to a first database in said telecommunication system, the first subscriber using said call to change call handling features associated with the first subscriber which controls the way calls to the first subscriber are handled;

validating the authority of the first subscriber seeking to enter the call handling feature change;

upon the authority of said first subscriber being validated, accepting and storing data specifically entered by said first subscriber to cause a change to be made to a call handling feature in said first database;

determining if said stored data in the first database corresponds to a valid, changeable call handling feature based on validation information previously stored in the first database;

upon validation of said stored data, automatically transmitting said data from said first database in said telecommunication network that contains a call handling record corresponding to said first subscriber, said call handling record in the second database controlling the handling of the first subscriber's calls;

modifying said call handling record in said second database based on said data to implement in real time said call handling feature change entered by said first subscriber, whereby subscribers can make changes in real time to call handling features.

2. The method according to claim 1 wherein said validating step comprises the steps of prompting the first subscriber to enter a password and authenticating the password entered by the first subscriber by comparing it to a password previously assigned to the first subscriber.

3. The method according to claim 2 wherein said prompting step comprises the steps of sending from said first database a prompt message to a speech system associated with the first subscriber and providing a voiced prompt request by the speech system to said first subscriber.

4. The method according to claim 1 wherein said accepting step comprises the step of analyzing said subscriber entered data to determine if a valid call handling feature would result if the data sent by the first subscriber is entered in said subscriber's record.

5. The method according to claim 1 wherein said accepting step comprises the step of accepting said data indicating a call handling feature change only at said first database for a predetermined group of subscribers.

6. The method according to claim 1 wherein said accepting step comprises the step of accepting said data only at said first database for all subscribers requesting real time changes to their respective call handling features, said data being sent by a telephone operated by the subscriber.

7. The method according to claim 1 further comprising the step of the subscribers calling a single telephone number to initiate a real time change to call handling features.

8. The method according to claim 7 wherein said telephone number is assigned so that calls to said single telephone number are routed to said first database.

9. The method according to claim 1 wherein said transmitting step comprises the step of transmitting said data from said first database to a second database automatically upon the termination of the entry of the data by said first subscriber at said first database.

10. The method according to claim 1 further comprising the steps of obtaining, in response to a call made by another party to said first subscriber, call handling information from the first subscriber's record at said second database and activating said first subscriber's modified record at said second database following said modifying step so that calls to said first subscriber will be subject to the modified call handling features.

11. The method according to claim 1 further comprising the step of sending said data from the first database to a first mate database to protect against the loss of the data in the event of a failure of one of the first and first mate databases, said sending step comprising said data being automatically sent by the first database to said first mate database to protect against the loss of the data in the event of a failure of one of the first and first mate databases.

12. The method according to claim 1 wherein said transmitting step comprises the step of identifying said second database from among a plurality of database that store call handling record for subscribers, transmitting said data from the said first database to an intelligent call processing device which contains the first subscriber's telephone number, said identifying step identifying the second database on the subscriber's telephone number.

13. The method according to claim 1 further comprising the step of sending said data from the second database to a second mate database to protect against the loss of the data in the event of a failure of one of the second and second mate databases, said sending step comprising said data being automatically sent by the second database to a second mate database to protect against the loss of the data in the event of a failure of one of the second and second mate databases.

14. In a telecommunication system that provides programmable call routing features, a method for permitting real time changes to be made by subscribers to their respective call routing features, the method comprising the steps of:

receiving and storing at a first database in said telecommunication system, data specifically entered by a first subscriber using a telephone to change a call routing feature that controls the handling of at least certain calls to the first subscriber;

determining if said first subscriber data stored in the first database corresponds to a valid, changeable call handling feature based on information stored in the first database;

if said determining step validates said stored data, automatically transmitting said stored data from said first database to a second database in said telecommunication system that contains a call routing record corresponding to said first subscriber, said call handling record in the second database controlling the handling of the first subscriber's calls;

modifying said call routing record in real time based on said stored data to implement said feature change entered by said first subscriber, whereby subscribers can make changes in real time to call routing features.

15. The method according to claim 14 further comprising the step of validating the authority of said first subscriber seeking to make a call routing feature change to be able to enter said change.

16. The method according to claim 15 wherein said validating step comprises the steps of prompting the first subscriber to enter a password and authenticating the password entered by the first subscriber by comparing it to a password previously assigned to the first subscriber.

17. The method according to claim 16 wherein said prompting step comprises the steps of sending from said first database a prompt message to a speech system associated with the first subscriber and providing a voiced prompt request by the speech system to said first subscriber.

18. The method according to claim 14 further comprising the step of analyzing said subscriber entered data to determine if a valid call routing feature would result if the data sent by the first subscriber is entered in said subscriber's record.

19. The method according to claim 14 wherein said receiving step comprises the step of accepting said data indicating a call routing feature change only at said first database for a predetermined group of subscribers.

20. The method according to claim 14 wherein said receiving step comprises the step of accepting said data only at said first database for all subscribers having the capability of requesting real time changes to their respective call routing features.

21. The method according to claim 14 further comprising the step of the subscribers calling a single telephone number to initiate a real time change to call routing features.

22. The method according to claim 21 wherein said telephone number is assigned so that calls to said single telephone number are routed to said first database, and said telephone number is a long distance toll free number.

23. The method according to claim 14 wherein said transmitting step comprises the step of transmitting said data from said first database to a second database automatically upon the termination of the entry of the data by said first subscriber at said first database.

24. The method according to claim 14 further comprising the step of obtaining, in response to a call made by another party to said first subscriber, call routing information from the first subscriber's record at said second database, and activating said first subscriber's modified record at said second database following said modifying step so that calls to said first subscriber will be subject to the modified call routing features.

25. The method according to claim 14 further comprising the step of sending said data from the first database to a first mate database to protect against the loss of the data in the event of a failure of one of the first and first mate databases, said sending step comprising said data being automatically sent by the first database to said first mate database to protect against the loss of the data in the event of a failure of one of the first and first mate databases.

26. The method according to claim 14 wherein said transmitting step comprises the step of identifying said second database from among a plurality of databases that store call routing records for subscribers, said transmitting step comprises the step of transmitting said data from the first database to an intelligent call processing device which contains the first subscriber's telephone number, said identifying step identifying the second database based on the subscriber's telephone number.

27. The method according to claim 14 further comprising the step of sending said data from the second database to a second mate database to protect against the loss of the data in the event of a failure of one of the second and second mate databases, said sending step comprising said data being automatically sent by the second database to a second mate database to protect against the loss of the data in the event of a failure of one of the second and second mate databases.

* * * * *